(12) United States Patent
Hsu (10) Patent No.: US 7,516,681 B2
(45) Date of Patent: Apr. 14, 2009

(54) EXTERNAL CIRCULATION TYPE BALL SCREW

(75) Inventor: Jui-Long Hsu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 146 days.

(21) Appl. No.: 11/778,015

(22) Filed: Jul. 13, 2007

(65) Prior Publication Data

US 2009/0013811 A1 Jan. 15, 2009

(51) Int. Cl.
*F16H 1/18* (2006.01)
(52) U.S. Cl. ............... 74/424.86; 74/424.87; 74/424.83
(58) Field of Classification Search ............... 74/424.81, 74/424.82, 424.83, 424.86, 424.87
See application file for complete search history.

(56) References Cited

U.S. PATENT DOCUMENTS

| 2003/0145670 | A1* | 8/2003 | Fujita et al. | 74/89.44 |
| 2004/0000208 | A1* | 1/2004 | Michioka et al. | 74/424.86 |
| 2005/0016308 | A1* | 1/2005 | Hayashi | 74/424.86 |
| 2006/0027038 | A1* | 2/2006 | Ohkubo et al. | 74/424.86 |
| 2007/0006676 | A1* | 1/2007 | Mizuhara et al. | 74/424.86 |
| 2007/0137348 | A1* | 6/2007 | Oetjen | 74/424.86 |
| 2007/0204713 | A1* | 9/2007 | Chen | 74/424.86 |
| 2008/0190231 | A1* | 8/2008 | Chiu et al. | 74/424.86 |

* cited by examiner

*Primary Examiner*—David M Fenstermacher
(74) *Attorney, Agent, or Firm*—Banger Shia (57) ABSTRACT

An external circulation type ball screw comprises a screw, a nut, rolling elements and a return member. The nut is a hollow structure mounted on the screw. The rolling elements are received in the helical groove of the screw and the rolling groove of the nut. The return member is disposed on the nut and includes a guiding member and a cover. The guiding member is defined with two guiding portions and a first half pipe, and each guiding portion is fixed in the fixing hole of the nut. The cover includes a fixing portion for covering the guiding portion and a second half pipe for covering the first half pipe. The return member is installed in the fixing hole through the guiding portion, and then the cover is used to cover the guiding member, thus finishing the assembly of the return member. In addition, the return device can be produced by molding process, and it solves the problem that the conventional return device is difficult to assemble.

16 Claims, 11 Drawing Sheets

EXTERNAL CIRCULATION TYPE BALL SCREW

BACKGROUND OF THE INVENTION

1. Field of the Invention

The present invention relates to an external circulation type ball screw, and more particularly to a tangent external circulation type ball screw.

2. Description of the Prior Art

Nowadays, ball screw is used more and more in the field of industry, in addition to the effect of high precision, the ball screw also has low friction, low noise and hard to destroy. Therefore, the ball screw is very important in terms of various machines.

In order to make the nut move relative to the screw endlessly, a return device must be mounted on the ball screw, such that the rolling elements can be circulated in the rolling groove endlessly. However, a return path of a conventional return device disclosed in U.S. Pat. No. 3,661,030 has a bent portion, when the rolling elements move at a high speed to impact the nail and the bent portion continually, the strength of the nail and the bent portion will be weakened. Thereby, the impact-caused scraps of the return member will fall between the rolling elements and affect the circulation of the rolling elements. Obviously, the damage of the return device will cause the failure of the ball screw.

Therefore, to solve the above-mentioned problem, a current method is to insert the bent pipe into the threaded tracks along the direction of tangent thereof, for example:

A return deice disclosed in U.S. Pat. No. 3,971,264 comprises a multi-sectional bent pipe which is a unstable structure due to it has multiple sections, and the direction of the pipe hole of the nut is the same as that of the lead-angle. Therefore, such a pipe hole is hard to process because it needs a multi-spindle processing machine.

The bent pipe of the return device disclosed in U.S. Pat. No. 4,953,419 is defined with two bent guiding passages, so the size of such bent portions is hard to control during manufacturing process. In addition, the problem of processing the pipe hole of such nut is the same as that of the above-mentioned return device. And the return device is fixed by a fixing piece mounted on the outer diameter of the nut, the return device fixed by such a method is unstable and increases the size of the outer diameter of the nut.

A return device disclosed in US Pat No. 2003/0213323 comprises plural members which are manufactured by many different molds. Thereby, the cost and the assembly time of the return device are increased, and the plural members will vibrate and cause noise when the rolling elements inside the return device move at a high speed.

In addition, the above-mentioned three conventional external circulation return devices has the same problem, that is, the position of the return device relative to the nut is hard to control, and the rolling elements are easy to fall off during the rolling-elements-loading process.

The present invention has arisen to mitigate and/or obviate the afore-described disadvantages.

SUMMARY OF THE INVENTION

The primary objective of the present invention is to provide an external circulation type ball screw, the pipe hole of the nut is easy to process without using a special machine (such as a multi-spindle processing machine), and the return device is easy to manufacture.

The second objective of the present invention is to provide an external circulation type ball screw, the return device is easy to position in place, and the rolling elements are easy to load, so as to reduce the assembly time of the ball screw.

The further objective of the present invention is to provide an external circulation type ball screw, the return device can be fixed to the nut stably, enabling the rolling elements to circulate more smoothly.

To achieve the objects of the present invention, the nut is a hollow structure mounted on the screw, the nut is defined with a rolling groove in the inner edge thereof, in the outer edge of the nut is defined a helical groove opposite the rolling groove, and between the rolling groove and the helical groove is mounted a plurality of rolling elements. In addition, in an outer periphery of the nut are defined a plane and a plurality of through holes, the plane is defined with a plurality of fixing holes, and each fixing hole penetrates the plane and is formed with a stopping surface. By such arrangements, a multi-spindle processing machine is not needed when processing the fixing holes. And each of the through holes is provided for insertion of the fixing member and is in communication with the fixing hole.

Moreover, the return device mounted on the nut for circulation of the rolling elements includes a guiding member and a cover. The guiding member is defined with two guiding portions and a first half pipe, each guiding portion is fixed in the fixing hole of the nut and is disposed with a nail, a guiding passage and a plurality of threaded holes. The cover includes two fixing portions for covering the guiding portions and a second half pipe for covering the first half pipe, and the fixing portion is defined with a through hole for insertion of a screw.

To summarize, the steps of assembling the return device are as follows:

Firstly, inserting the guiding portions of the guiding member in the fixing holes, and inserting the fixing element through the through hole of the nut and screwing it in the threaded hole of the guiding portion, and with the fixing effect produced by the stopping surface formed on the bottom thereof, the return device can be positioned.

Secondly, inserting the fixing element through the through hole of the nut and screwing it in the threaded hole of the guiding portion, and finally covering the guiding member with the cover, thus finishing the assembly of the return device.

In a word, with the fixing effect produced by the cooperation of the guiding portion and the fixing hole, and by the fixing element threaded with the threaded hole of the guiding portion after passing through the through hole of the nut, the return device can be assembled to the nut stably.

In addition, it is to be noted that since the connection of the guiding member, the rolling groove and the helical groove, the rolling elements can be loaded between the rolling groove and the helical groove one by one via the guiding passage of the guiding member, and then the cover is used to cover the guiding member, such arrangements can reduce the time of loading the rolling elements. The return device is formed by molding process, so it can be mass produced. The fixing hole of the nut can be made by a common processing machine, plus the design of the plane, so that the processing precision of the fixing hole can be improved.

The present invention will become more obvious from the following description when taken in connection with the

DETAILED DESCRIPTION OF THE PREFERRED EMBODIMENTS

Referring to FIGS. 1-3, 4A, 4B, 5A, 5B, 6A, 6B, 7 and 8, an external circulation type ball screw in accordance with the present invention comprises: a screw 1, a nut 2, a plurality of rolling elements R, and a return device 99.

Figure 1:
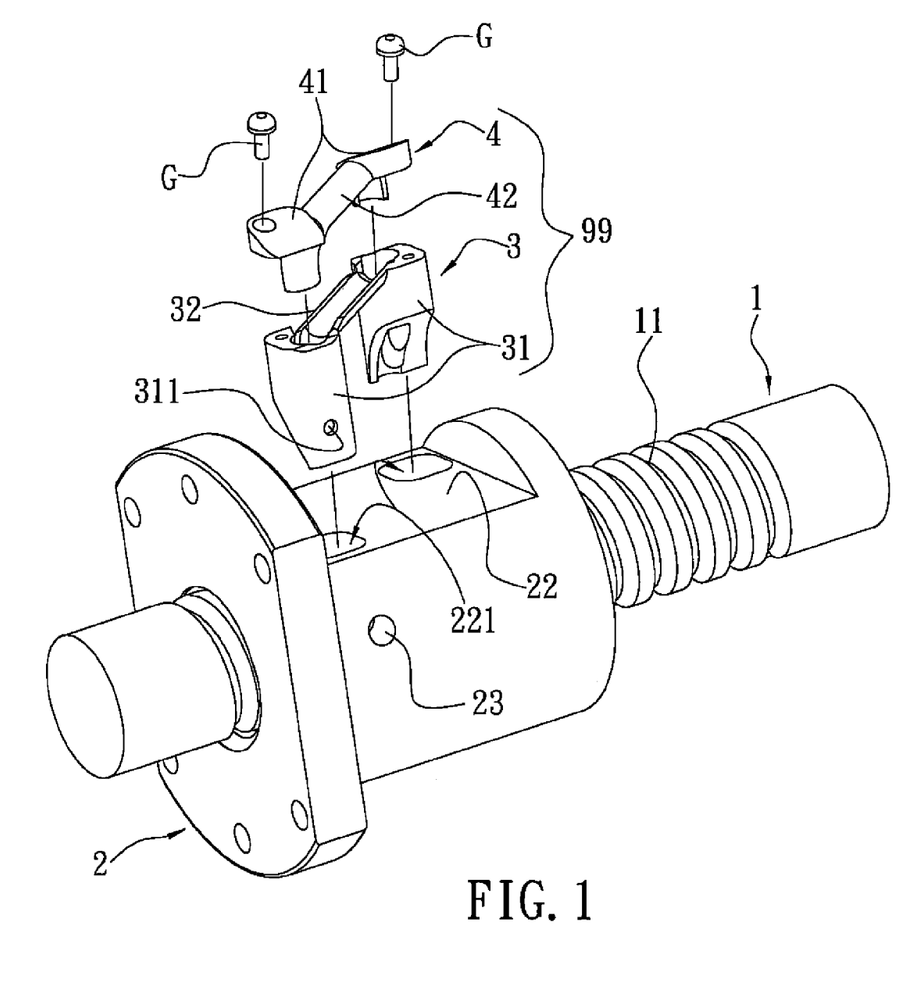
FIG. 1 is an exploded view of an external circulation type ball screw in accordance with the present invention.
Figure 2:
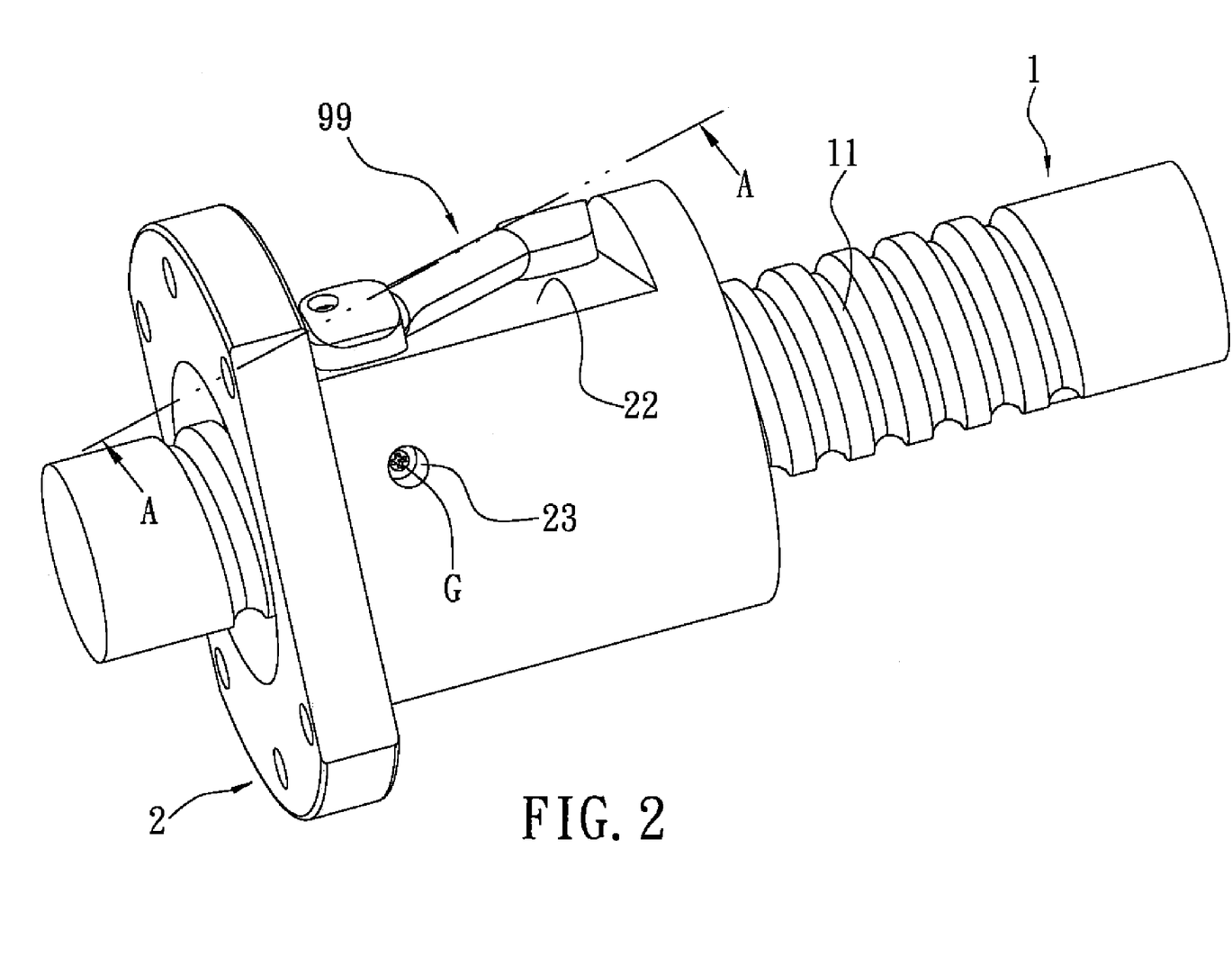
FIG. 2 is an assembly view of the external circulation type ball screw in accordance with the present invention.
Figure 3:
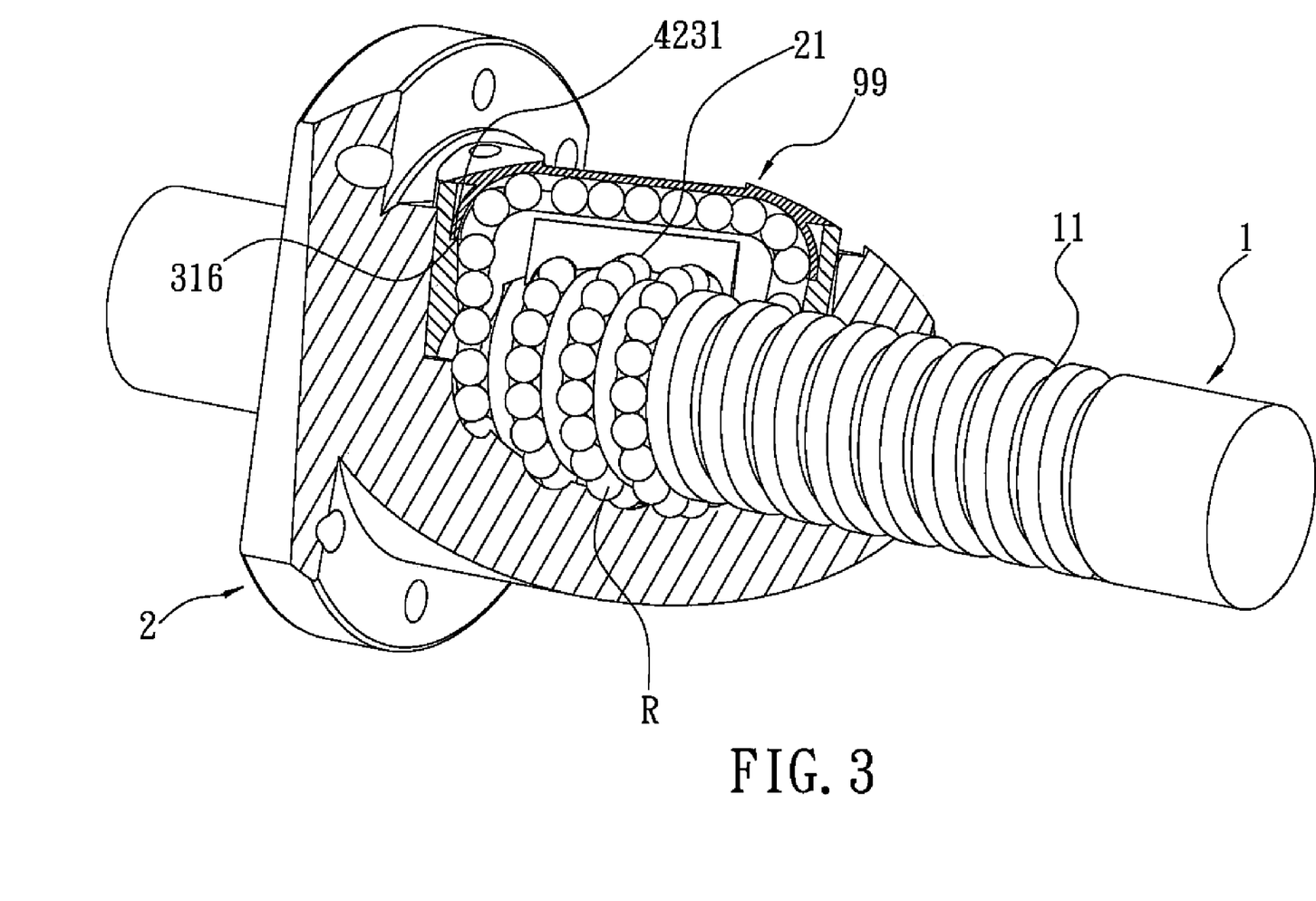
FIG. 3 is a cross sectional view of FIG. 2 taken along the line A-A.

The screw 1 is formed with a helical groove 11.

Figure 4A:
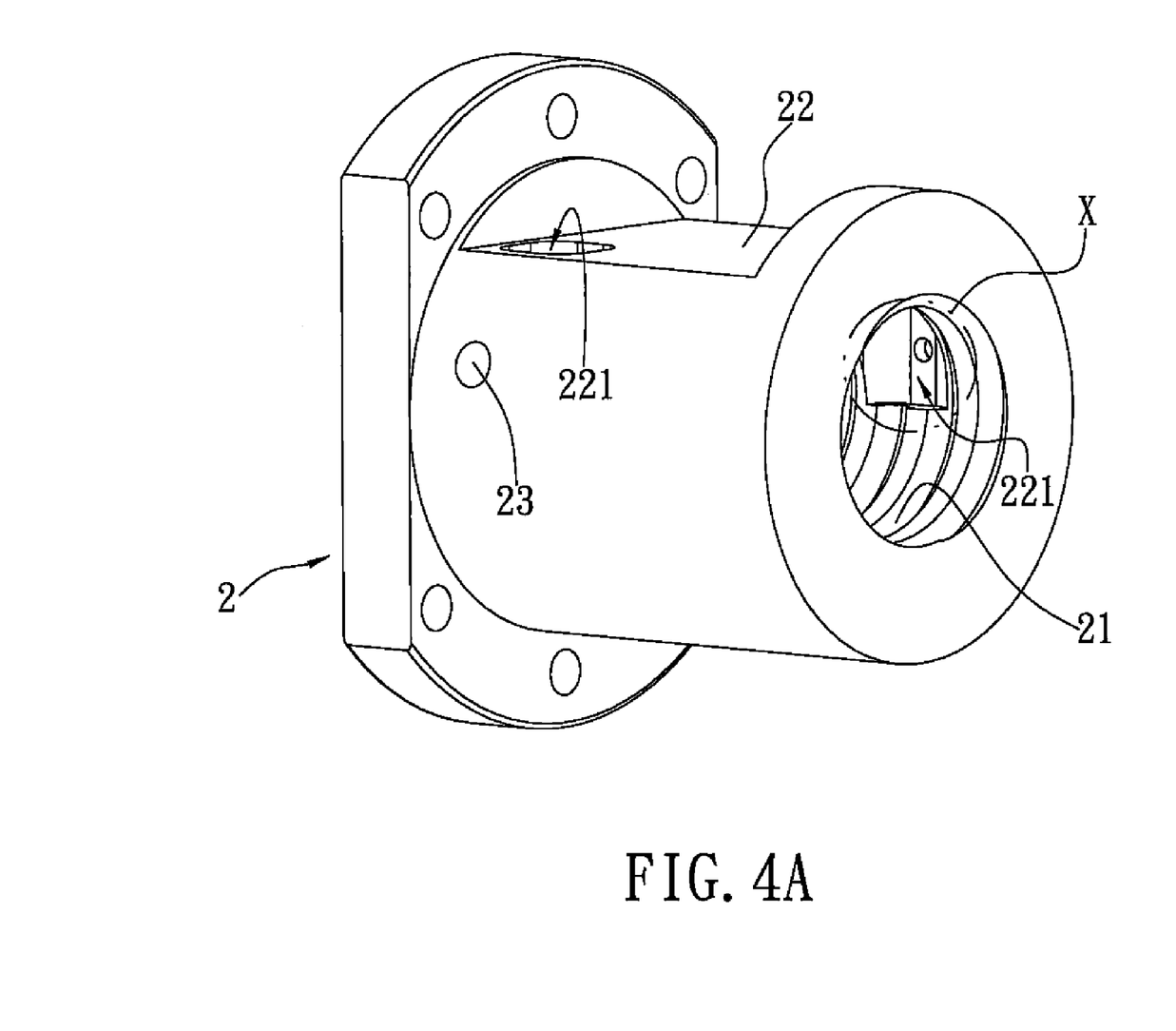
FIG. 4A is a perspective view of a nut in accordance with the present invention.
Figure 4B:
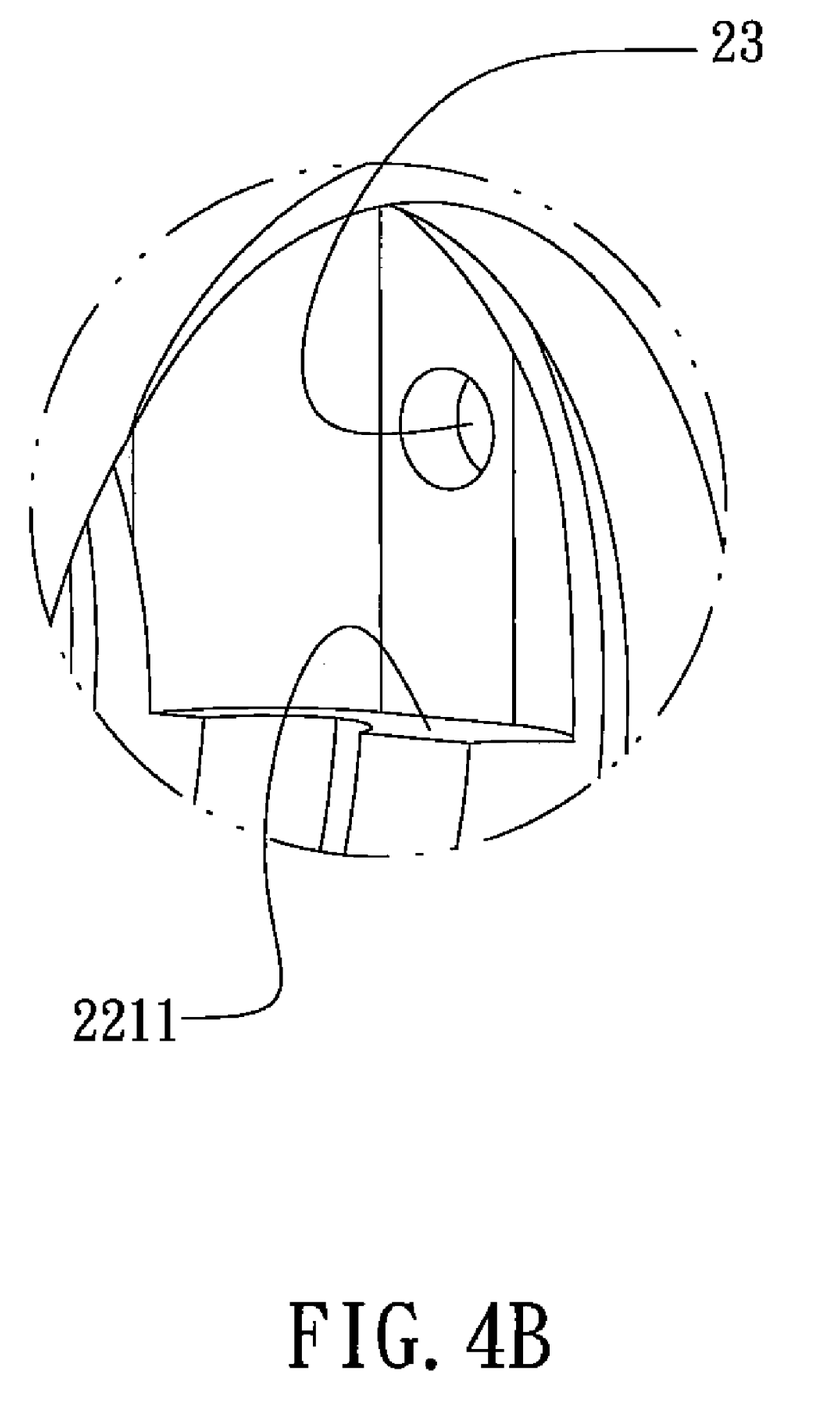
FIG. 4B is a partial amplified view of X of FIG. 4A.

The nut 2 is a hollow structure defined with a rolling groove 21, and the rolling groove 21 is opposite the helical groove 11. The nut 2 is mounted on and reciprocates along the screw 1. In a periphery of the nut 2 are formed a plane 22 and a plurality of through holes 23. The plane 22 is defined with a plurality of fixing holes 221, and each fixing hole 221 penetrates the plane 22 and is formed with a stopping surface 2211 (as shown in FIG. 4B). Each of the through holes 23 is provided for insertion of a fixing element G and is in communication with the fixing hole 221.

The plurality of rolling elements R is disposed between the rolling groove 21 and the helical groove 11.

Figure 7:
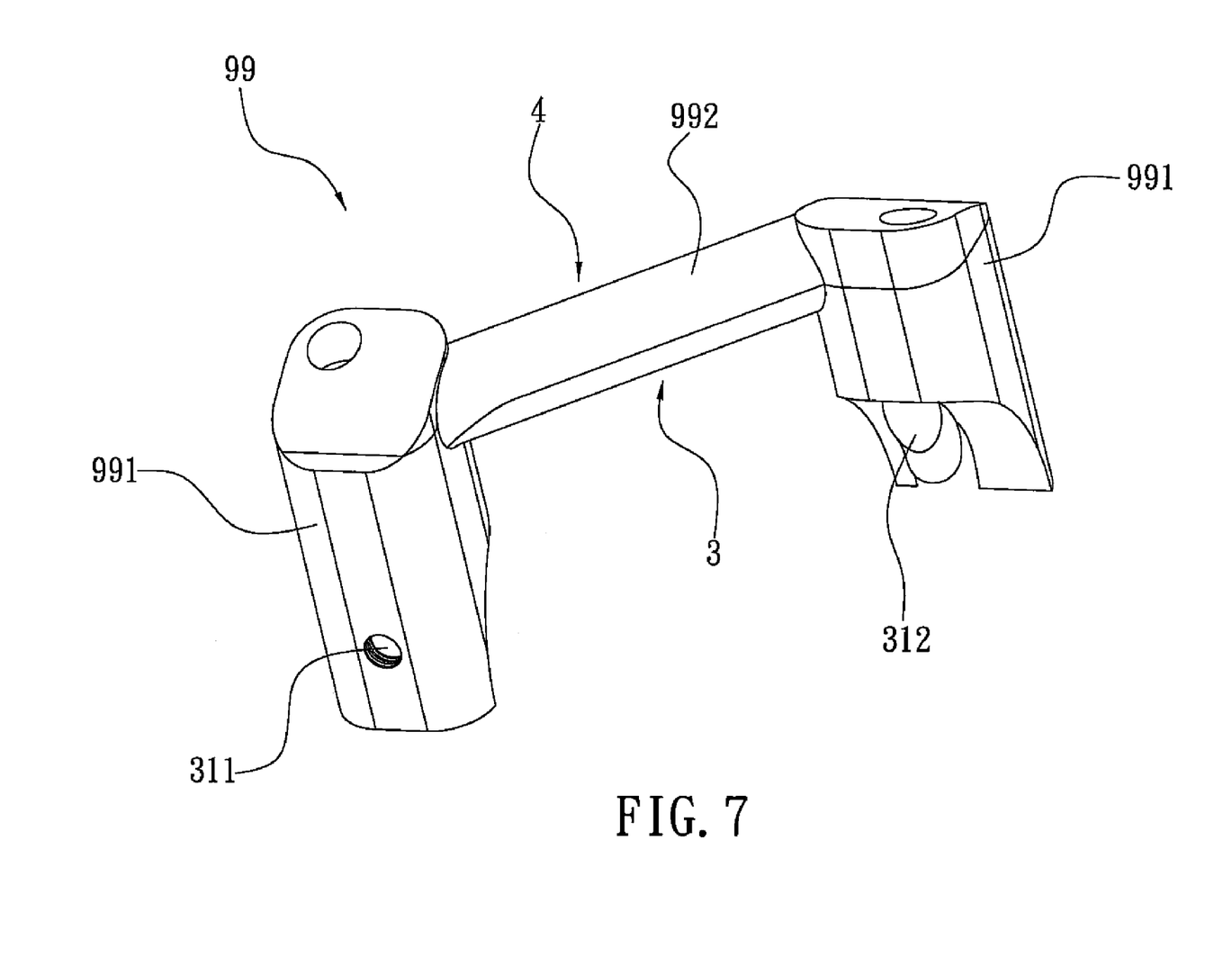
FIG. 7 is a perspective view of a return device in accordance with the present invention.
Figure 8:
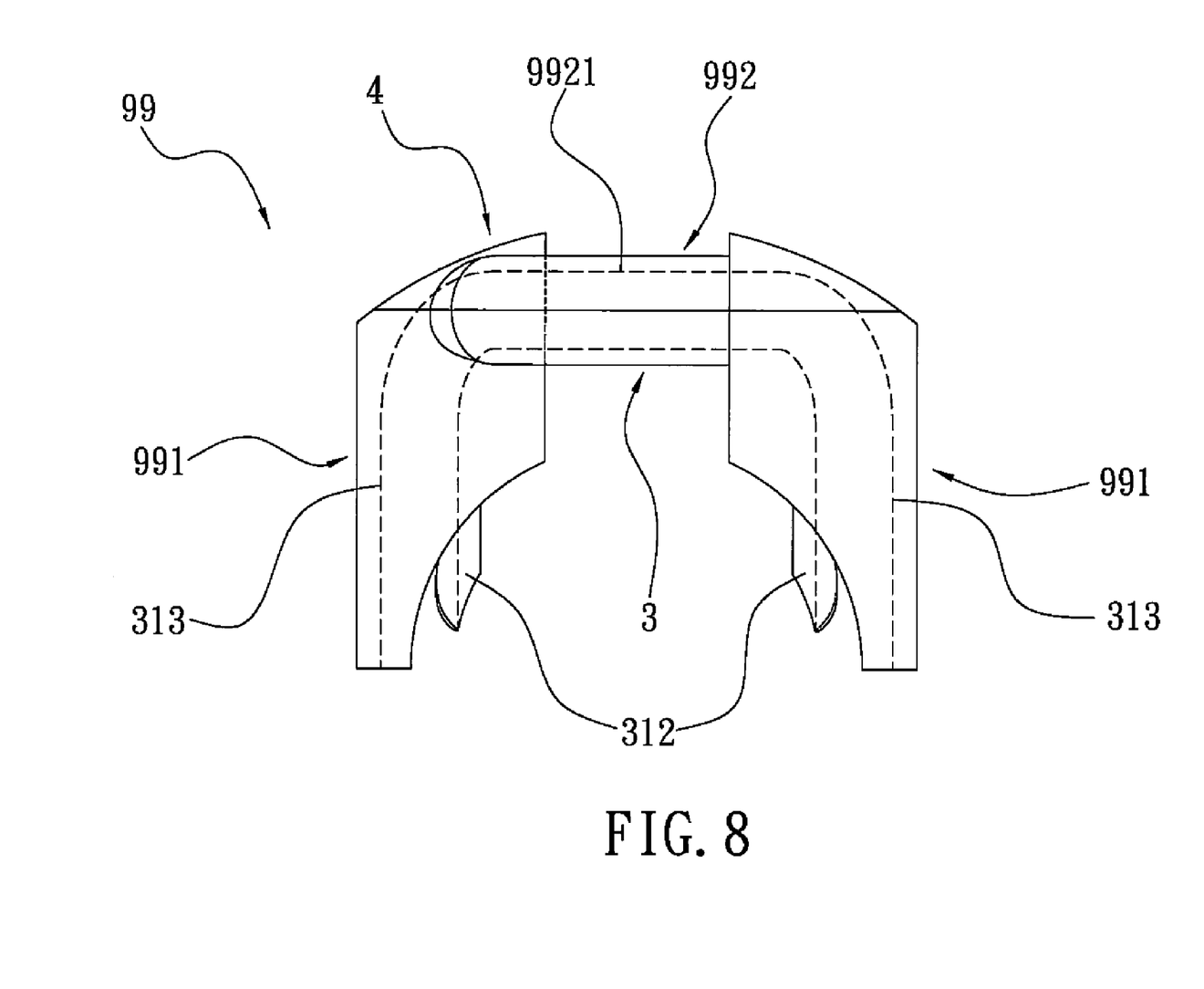
FIG. 8 is a front view of the return device in accordance with the present invention.

The return device 99 includes a guiding member 3 and a cover 4.

Figure 5A:
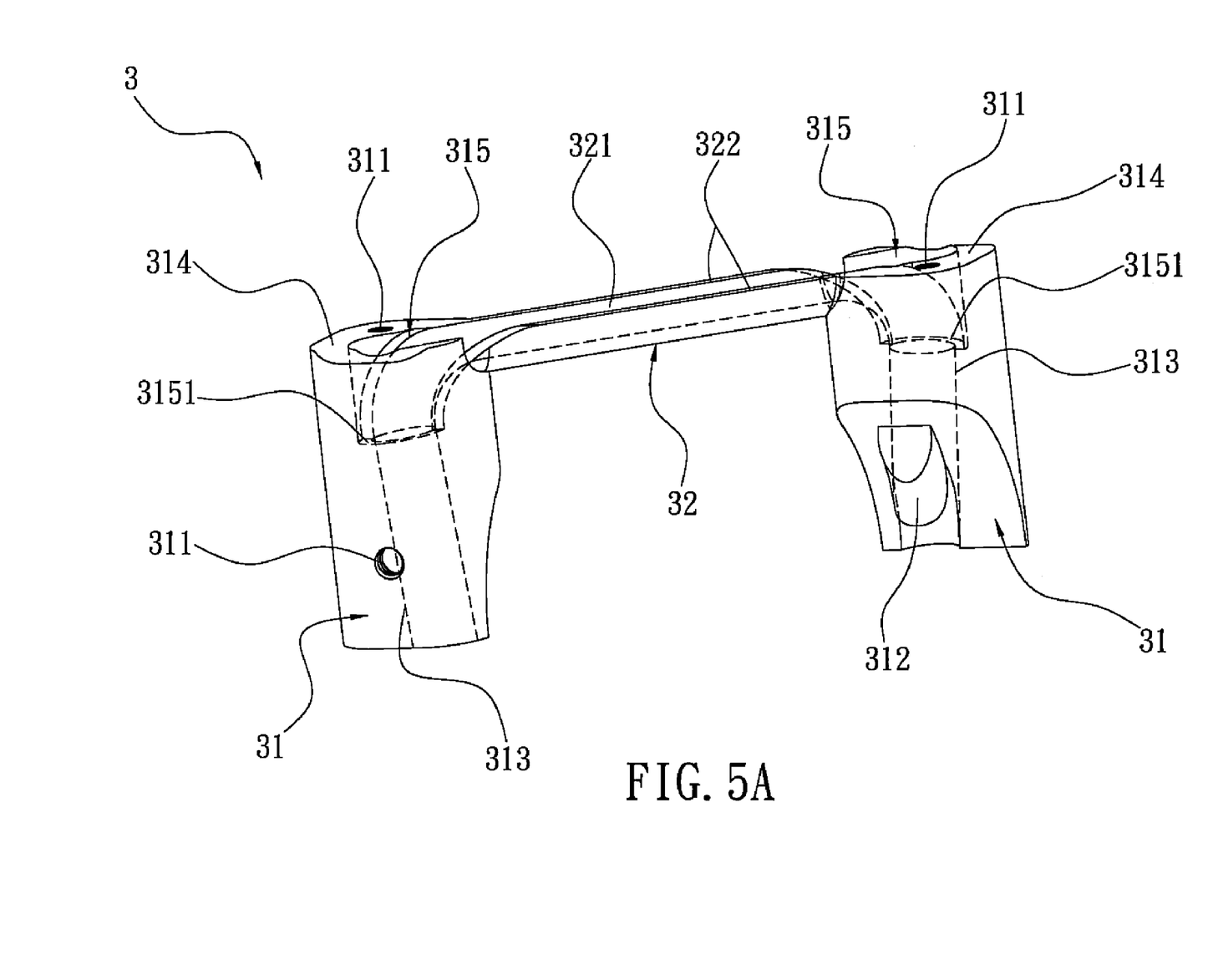
FIG. 5A is a perspective view of a guiding member in accordance with the present invention.
Figure 5B:
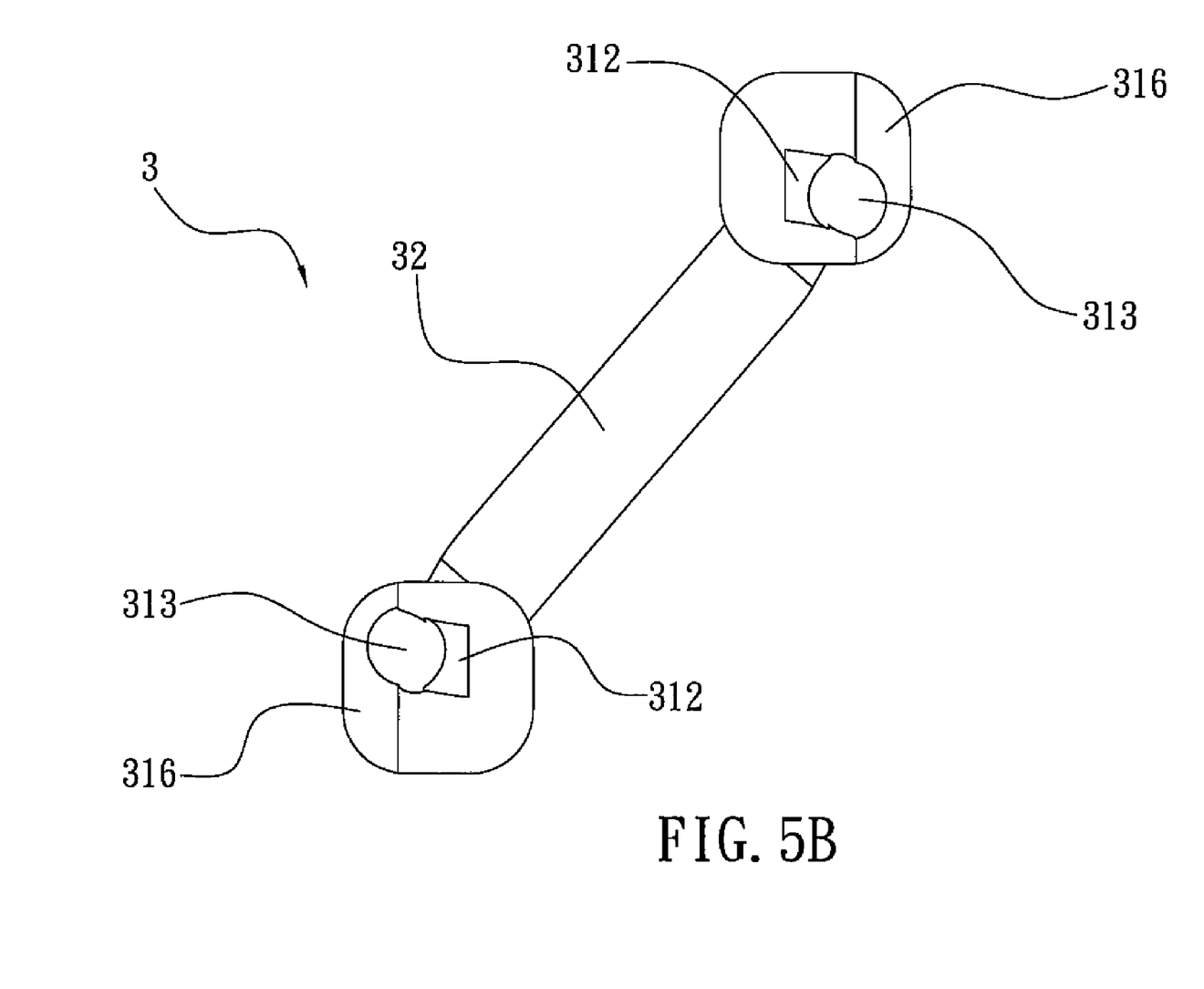
FIG. 5B is a back view of the guiding member in accordance with the present invention.

The guiding member 3 is defined with two guiding portions 31 and a first half pipe 32.

The guiding portion 31 is fixed in the fixing hole 221 of the nut 2 and is disposed with a nail 312, a guiding passage 313, a joining hole 315 and a plurality of threaded holes 311. The nail 312 protrudes toward and is inserted in the rolling groove 21 of the nut 2. The guiding passage 313 is an open passage extending from a bottom 316 to a top surface 314 of the guiding portion 31. The guiding passage 313 is parallel to a helical angle between the helical groove 11 and the rolling groove 21 and is tangent to the threaded lines of the helical groove 11 and the rolling groove 21, such arrangements reduce the impact force of the rolling element R against the guiding passage 313, thus enabling the rolling elements R to circulate more smoothly. One end of the guiding passage 313 is connected to the helical groove 11 and the rolling groove 21, and the other end of the guiding passage 313 is connected to the first half pipe 32. In the joining hole 315 is formed a jointing surface 3151, the threaded holes 311 are defined in the lateral surface and the top surface 314 of the guiding portion 31, and the threaded holes 311 in the lateral surface are located correspondingly to the through holes 23 of the nut 2.

The first half pipe 32 is mounted between the guiding portions 31 and is defined with a first half passage 321 and a first attaching surface 322, and the first half passage 321 is connected to the guiding passage 313 of the guiding portion 31.

Figure 6A:
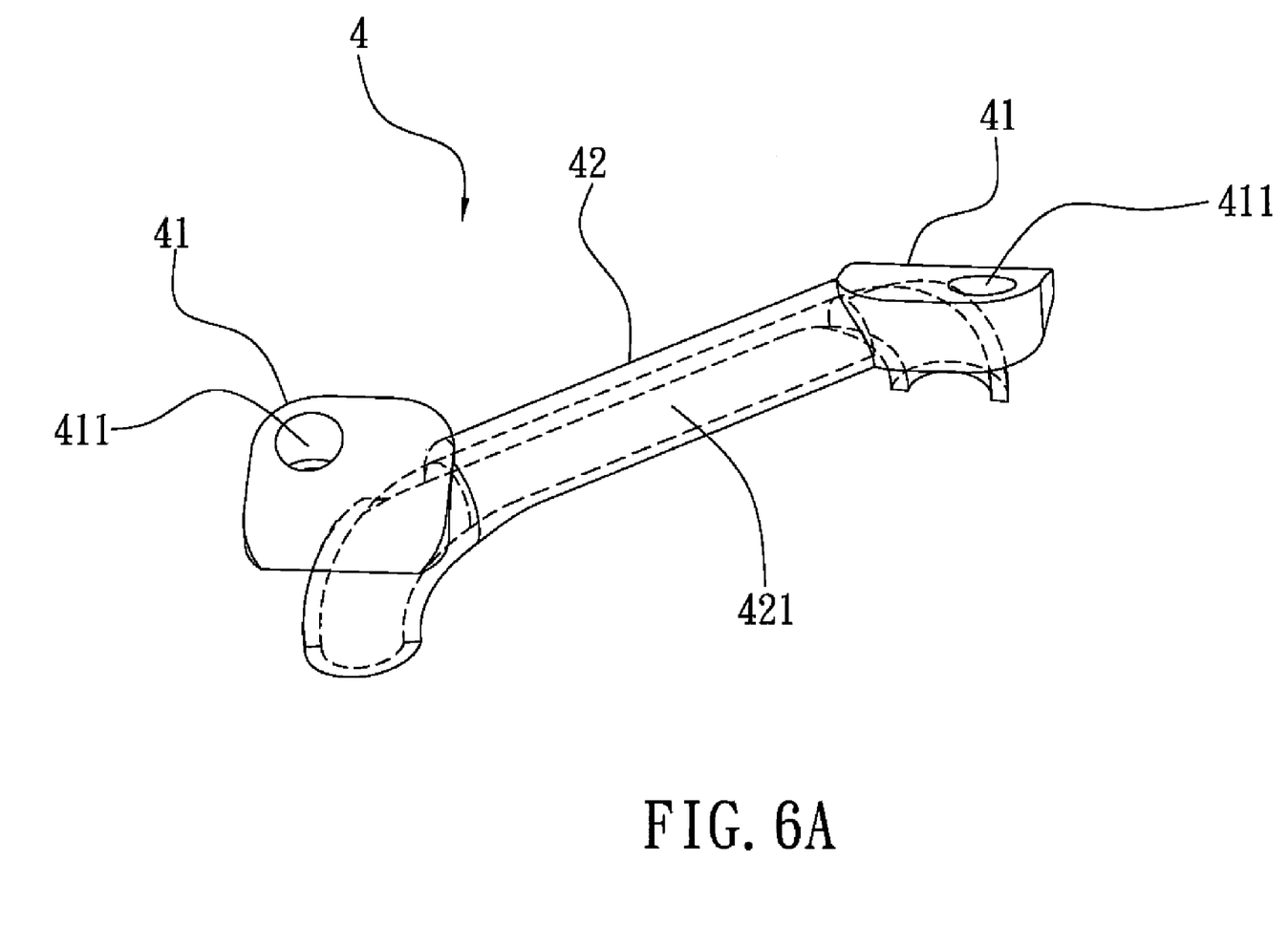
FIG. 6A is a perspective view of a cover in accordance with the present invention.
Figure 6B:
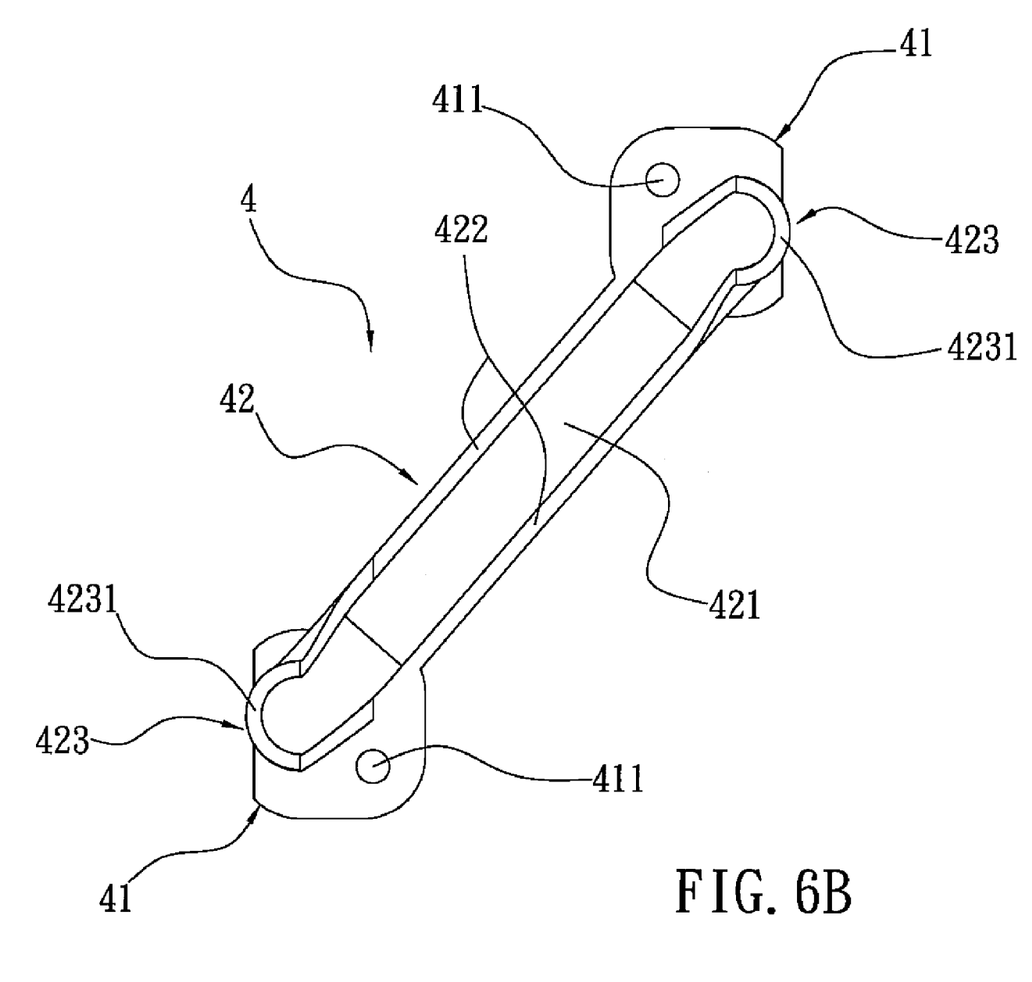
FIG. 6B is a back view of the cover in accordance with the present invention.

The cover 4 covers the guiding member 3 and includes a second half pipe 42 and two fixing portions 41.

The second half pipe 42 is connected to the fixing portions 41 and covers the first half pipe 32, and both ends of the second half pipe 42 are protruded with an extending portion 423. Each of the extending portions 423 is formed with an extending surface 4231 that is attached to the joining hole 315 of the guiding member 3. The second half pipe 42 is defined with a second half passage 421 and a second attaching surface 422.

The fixing portion 41 covers the top surface 314 and is defined with a hole 411 relative to the threaded holes 311 of the top surface 314.

For a better understanding of the present invention, its operations and functions, reference should be made to FIGS. 1-3, 4A, 4B, 5A, 5B, 6A, 6B, 7 and 8 again:

Firstly, inserting the guiding portions 31 of the guiding member 3 in the fixing holes 221 of the nut 2, such that the bottoms 316 of the guiding portions 31 are attached to the stopping surfaces 2211, and the lateral surface of each guiding portion 31 is attached to the inner edge of the fixing hole 221, so as to prevent the foreign objects from entering the nut 2 from the gap of the bottom 316 and the stopping surface 2211, and from the gap of the lateral surface and the inner edge of the fixing hole 221. And then inserting the fixing element G through the through hole 23 of the nut 2 and screwing it in the threaded hole 311 of the guiding portion 31, thus finishing the assembly of the guiding member 3.

In addition, it is to be noted that the present invention is applicable to the screw 1 whose helical groove does not extend to the shoulder portion or both ends thereof, the rolling element R can be loaded after the guiding member 3 is assembled, and then the return device 99 can be installed.

Furthermore, covering the guiding member 3 with the cover 4 after the guiding member 3 being assembled, and the fixing portion 41 is attached to the top surface 314 of the guiding portion 31, so as to prevent the foreign objects from entering the return device 99 from the gaps. And the fixing element G is threaded with the threaded hole 311 of the top surface 314 after passing through the hole 411, thus forming a return portion 991. Further, the extending portion 423 is received in the jointing hole 315, and the extending surface 4231 of the extending portion 423 is attached to the jointing surface 3151 of the jointing hole 315 (as shown in FIG. 5), thus forming a flat and smooth passage. In addition, the first attaching surface 322 of the first half pipe 32 is attached to the second attaching surface 422 of the second half pipe 42, thus forming a complete guiding pipe 992. The guiding pipe 992 is defined with a return passage 9921 formed by the first half passage 321 and the second half passage 421, and the return passage 9921 is connected to the guiding passage 313 of the return portion 991 to form a complete return path. The return path is connected to the helical groove 11 and the rolling groove 21, and then the fixing element G can be circulated in the ball screw endlessly.

The followings are the advantages of the present invention:

Firstly, the nut is easy to process since it can be made by the conventional processing machine.

Secondly, the return device is formed by molding process and can be mass produced.

Thirdly, with the fixing effect produced by the cooperation of the guiding portion and the fixing hole, and by the fixing element threaded with the threaded hole of the guiding portion after passing through the through hole of the nut, the fixing element is prevented from vibrating and causing noise during circulating operation.

Fourthly, the return device is easy to assemble and position in place, thus facilitating the loading of the rolling elements.

To summarize, the return device of the present invention solves the conventional disadvantages, and the prevent invention can reduce the assembly time of the ball screw and the cost of the return device.

While we have shown and described various embodiments in accordance with the present invention, it should be clear to those skilled in the art that further embodiments may be made without departing from the scope of the present invention.

What is claimed is:

1. An external circulation type ball screw, comprising:
a screw defined with a helical groove;
a nut being a hollow structure defined with a rolling groove, the rolling groove being opposite the helical groove, the nut being mounted on and reciprocates along the screw, in a periphery of the nut being formed a plane defined with a plurality of fixing holes, each fixing hole having a stopping surface;
a plurality of rolling elements mounted between the rolling groove and the helical groove;
a return device including a guiding member and a cover;
the guiding member defined with two guiding portions and a first half pipe;
each guiding portion fixed in the fixing hole of the nut and disposed with a nail and a guiding passage, the nail protruded toward and inserted in the rolling groove of the nut, one end of the guiding passage being connected to the helical groove and the rolling groove, the other end of the guiding passage being connected to the first half pipe, the first half pipe being mounted between the guiding portions and being defined with a first half passage;
the cover including a second half pipe and two fixing portions, the second half pipe being connected to the fixing portions and covering the first half pipe, the second half pipe being defined with a second half passage, and the fixing portion covering the guiding portion.

2. The external circulation type ball screw as claimed in claim 1, wherein a plurality of through holes is formed in a periphery of the nut and is in communication with the fixing holes.

3. The external circulation type ball screw as claimed in claim 1, wherein the guiding passage is parallel to a helical angle between the helical groove and the rolling groove and is tangent to the threaded lines of the helical groove and the rolling groove.

4. The external circulation type ball screw as claimed in claim 1, wherein the first half pipe is defined with a first attaching surface.

5. The external circulation type ball screw as claimed in claim 1, wherein the guiding portion is defined with a jointing hole formed with a jointing surface.

6. The external circulation type ball screw as claimed in claim 1, wherein the first half pipe cooperates with the second half pipe to form a guiding pipe.

7. The external circulation type ball screw as claimed in claim 2, wherein in lateral and top surfaces of the guiding portion is defined a plurality of threaded holes.

8. The external circulation type ball screw as claimed in claim 4, wherein the second half pipe is formed with a second attaching surface.

9. The external circulation type ball screw as claimed in claim 5, wherein both ends of the second half pipe are protruded with an extending portion inserted into the jointing hole.

10. The external circulation type ball screw as claimed in claim 6, wherein the guiding pipe is defined with a return passage formed by the first half passage and the second half passage.

11. The external circulation type ball screw as claimed in claim 7, wherein the threaded holes in the lateral surface of the guiding portion are opposite the through holes of the nut.

12. The external circulation type ball screw as claimed in claim 7, wherein the fixing portion is defined with a hole relative to the threaded hole of the top surface.

13. The external circulation type ball screw as claimed in claim 8, wherein the first attaching surface is attached to the second attaching surface.

14. The external circulation type ball screw as claimed in claim 9, wherein each of the extending portions is formed with an extending surface.

15. The external circulation type ball screw as claimed in claim 10, wherein the return passage is connected to the guiding passage.

16. The external circulation type ball screw as claimed in claim 14, wherein the extending surface is attached to the jointing surface of the joining hole.

* * * * *